June 3, 1969     F. MABEN     3,447,728
STABILIZED MEAL SERVING TRAY
Filed Sept. 22, 1967
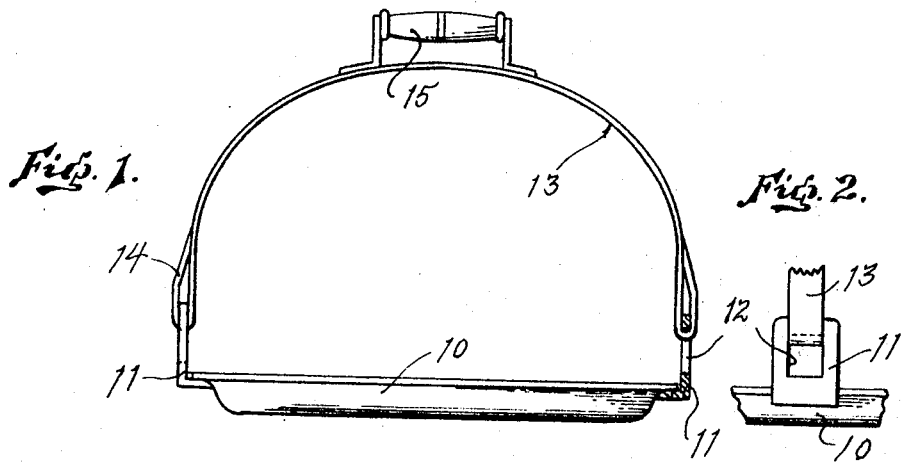
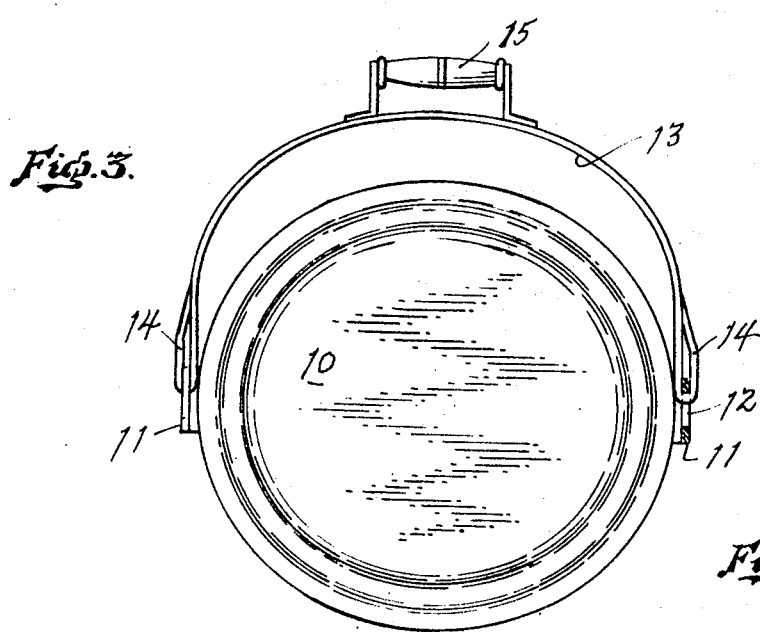
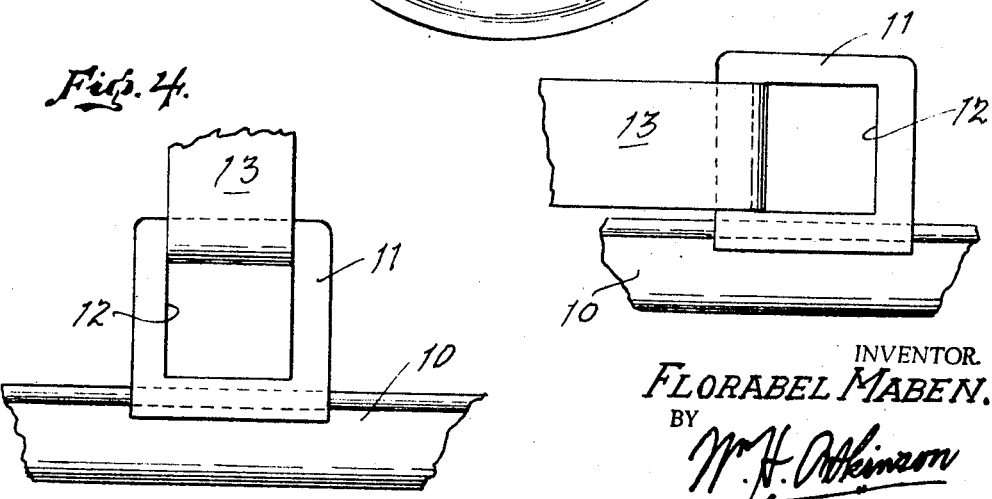
INVENTOR.
FLORABEL MABEN.
BY
ATTORNEY

United States Patent Office 3,447,728
Patented June 3, 1969

3,447,728
STABILIZED MEAL SERVING TRAY
Florabel Maben, 1405 W. Center St.,
Visalia, Calif. 93277
Filed Sept. 22, 1967, Ser. No. 669,806
Int. Cl. A47g 23/06; B65d 25/32
U.S. Cl. 224—48                3 Claims

ABSTRACT OF THE DISCLOSURE

The purpose of this invention is to provide a bale-like carrying means for shallow food serving trays and the like in which a bale-like handle of flat ribbon-like cross-section is looped at its ends and extended through hinge forming supporting ears having a rectangular bale accommodating opening, as distinguished from a round opening, through which the looped ends of the bale-like handle extend so that when loaded and in use the tray will be held in a substantially horizontal plane and stabilized against tipping when loaded and supported by the bale-like handle.

My present invention relates to article carrying trays and more particularly to a tipless carrying means for such trays.

An object of the invention is to provide a food serving tray for hospital and home use having a single hand held carrying means by which the tray can be carried in one hand as an aid for convalescents and semi-invalids who often have to rely on a walking cane or a stairway rail and find it difficult if not impossible to carry food and other articles on a tray from one point to another without tipping.

Another object of the invention is to provide a novel type of hinge connection between a serving tray and a bale-like carrying handle by which the handle is stabilized so that the tray cannot tip from its normal horizontal position when carried by one hand of a user.

There are many homes where aged couples are required to serve one or the other with food and the like. This is particularly true in the case of a convalescent or semi-invalid in caring for themselves who, due to other infirmities, are generally unsteady on their feet and therefore unable to use both hands for carrying a tray. It is therefore a further object of the invention to provide a carrying means for a food and the like serving tray which can be carried in one hand and thus leave free the other hand for a walking cane, the railing of a stairway or other helpful support.

Other objects and advantages will be in part evident to those skilled in the art and in part pointed out hereinafter in the following description taken in connection with the accompanying drawing wherein there is shown by way of illustration and not of limitation a preferred embodiment of the invention.

In the drawings, wherein like numerals refer to like parts throughout the several views, FIGURE 1 is a side view of a tray having a carrying handle constructed in accordance with the invention, FIGURE 2 is a fragmentary view of a detail projected from the right side of FIG. 1, FIGURE 3 is a plan view of the tray as shown in FIG. 1 with the carrying handle laid down and not in use, FIGURE 4 is an enlarged fragmentary view of the detail as shown in FIG. 2, and FIGURE 5 is a view similar to FIG. 4 showing the carrying handle in its inoperative position.

Reference is now made to the accompanying drawing for a more detailed description of the invention, wherein the numeral 10 designates a conventional flat and shallow serving tray such as may be used in serving food and/or carrying various articles from one point to another. In this instance the tray is shown of oblong elliptical configuration with bale supporting ears 11 at diametrically opposite points along the longer axis of the tray, these bale supporting ears 11, as shown in FIGURE 2, have a rectangular opening 12 through which the ends of a band or ribbon-like supporting bale 13 is extended and folded back upon itself at its ends as at 14 to provide hinge-like connections between the bale-like member 13 and each of the ears 11. The folded back ends 14 of the bale-like member 13 are so formed as to permit a turning of the bale-like member 13 with respect to the tray 10 when not in use. In this manner, as shown in FIGURE 3, the bale-like member 13 is capable of being laid down at one side of the tray when not in use or while the tray is being loaded for transportation of articles to a distant point. At this point it should be stated that the bale-like member 13 is of relatively rigid construction and that the width thereof will be sufficient to provide a stabilizing engagement with the ears 11 when the loaded tray is supported thereby. As a further but not necessary feature, the bale-like member 13 is here shown as provided with a suitable hand grip 15 that will serve to stabilize the tray 10 along its lateral axis.

By referring to FIGURES 4 and 5 of the drawing wherein the bale supporting ears 11 have a square opening 12 with sides of a dimension substantially corresponding with the width of the ribbon-like supporting bale 13 so that when the tray 10 is supported by the bale 13 the tray 10 will be held in a plane substantially perpendicular to the plane in which the bale 13 is held by its handle 15 and when the bale 13 is not in use the rectangular opening of the bale 11 will permit the bale 13 to assume an inoperative position as shown in FIGURES 3 and 5 of the drawing.

While I have described my invention as particularly useful in the hands of invalid and convalescent persons who are unable to use both hands in supporting a tray, it is also conceivable that my invention may find considerable use in connection with the trays upon which food is accumulated for patients in a hospital and in cafeterias. While slide rails are generally provided in cafeterias for these trays at the food delivery stations, there is the problem of carrying the loaded tray to a table at some distant point particularly where a shopper has dropped in for a snack or lunch with an arm full of bundles which make it difficult to use both hands on the tray.

Having thus described my invention, what I claim and desire to secure by Letters Patent is:

1. A food and article carrying oblong tray of shallow depth upon which servings of food and other articles may be carried having a rigid bale-like handle of rectangular cross-section with a width substantially greater than its thickness, said handle having overlapping end portions, a bale ear at diametrically opposite points on the longer axis of the tray and extending upwardly from said tray, characterized by the fact that said bale ears have a rectangular opening with a horizontal and vertical dimension substantially corresponding with the width of said bale-like handle, whereby said bale may be laid flat with the tray when not in use and will stabilize said tray when held in a plane perpendicular to the tray when in use.

2. The invention as set forth in claim 1, characterized by the fact that said pair of ears extend upwardly in parallel relation at opposite sides of said tray and have a square opening with horizontal and vertical dimensions corresponding substantially with the width of said bale-like handle.

3. The invention as set forth in claim 1, characterized by the fact that said tray is of elliptical configuration and said ears are secured to said tray at opposite points along the longest axis of the tray.

References Cited

UNITED STATES PATENTS

| | | |
|---|---|---|
| 2,001,438 | 5/1935 | Stuck. |
| 2,114,737 | 4/1938 | Gray _____ 220—94 X |
| 2,896,809 | 7/1959 | Metzger _____ 220—95 |
| 3,039,506 | 6/1962 | Reiter _____ 150—12 |

FOREIGN PATENTS 801,050  9/1958  Great Britain.

GERALD M. FORLENZA, *Primary Examiner.*

U.S. Cl. X.R.

220—91